(12) United States Patent
Mao (10) Patent No.: US 7,631,136 B2
(45) Date of Patent: Dec. 8, 2009

(54) STATE NEGOTIATION METHOD IN PCI-E ARCHITECTURE

(75) Inventor: Jin-Liang Mao, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 509 days.

(21) Appl. No.: 11/490,351

(22) Filed: Jul. 20, 2006

(65) Prior Publication Data

US 2007/0140139 A1 Jun. 21, 2007

(30) Foreign Application Priority Data

Dec. 19, 2005 (CN) .................. 2005 1 0022955

(51) Int. Cl.
*G06F 13/36* (2006.01)
(52) U.S. Cl. ..................... 710/314; 370/352
(58) Field of Classification Search .................. 710/311, 710/313–314; 370/352
See application file for complete search history.

(56) References Cited

U.S. PATENT DOCUMENTS

| 5,588,004 | A | 12/1996 | Suzuki |
| 7,293,125 | B2 * | 11/2007 | McAfee et al. ............... 710/107 |
| 7,353,443 | B2 * | 4/2008 | Sharma ...................... 714/742 |
| 2004/0088469 | A1 * | 5/2004 | Levy .......................... 710/316 |
| 2005/0270988 | A1 * | 12/2005 | DeHaemer .................. 370/254 |
| 2006/0161714 | A1 * | 7/2006 | Sue ............................ 710/309 |
| 2006/0271713 | A1 * | 11/2006 | Xie et al. .................... 710/100 |

* cited by examiner

*Primary Examiner*—Clifford H Knoll
(74) *Attorney, Agent, or Firm*—Kirton & McConkie; Evan R. Witt (57) ABSTRACT

In a state negotiation method of a PCI-E upstream device supporting multiple downstream configurations, a state of a second link asserted by a second state machine of the PCI-E upstream device is detected when a first link asserted by a first state machine of the PCI-E upstream device is ready to change from a first state to a second state in a specified duration. A negotiating procedure is performed to have the first link and the second link enter the second state simultaneously if the second link is detected to be in the first state within the specified duration.

17 Claims, 6 Drawing Sheets

Link A
Trans COM A1 A2 A3 A4 A5 A6 A7 A8 A9 AA AB AC AD

Link B
Trans     COM B1 B2 B3 B4 B5 B6 B7 B8 B9

Fig.3(a)

| Trans(Link A) | COM | A1 | A2 | A3 | COM | A1 | A2 | A3 | A4 | A5 | A6 | A7 | A8 |
|---|---|---|---|---|---|---|---|---|---|---|---|---|---|
| Trans(Link B) | ** | ** | ** | ** | COM | B1 | B2 | B3 | B4 | B5 | B6 | B7 | B8 |

Fig.3(b)

| Trans(Link A) | 00 | 00 | 00 | 00 | COM | A1 | A2 | A3 | A4 | A5 | A6 | A7 | A8 |
|---|---|---|---|---|---|---|---|---|---|---|---|---|---|
| Trans(Link B) | ** | ** | ** | ** | COM | B1 | B2 | B3 | B4 | B5 | B6 | B7 | B8 |

# STATE NEGOTIATION METHOD IN PCI-E ARCHITECTURE

FIELD OF THE INVENTION

The present invention relates to a method for state negotiation, and more particularly to a state negotiation method of a PCI Express upstream device supporting multiple downstream configurations.

BACKGROUND OF THE INVENTION

PCI Express (PCI-E) technology has been widely used due to the flexible multi-connecting cabling feature. For example, a PCI-E upstream device having a 16-lane port is able to communicate with one or more downstream devices via one 16-lane cable, two 8-lane cables, four 4-lane cables, or one 8-lane cable plus two 4-lane cables. As depicted in FIG. 1(a) to 1(d), a PCI Express upstream device 10, which comprises a port having 16 PCI-Express lanes, can be flexibly connected with a PCI Express downstream device 11 having 16 lanes (FIG. 1(a)), two PCI Express downstream device 12 each having 8 lanes (FIG. 1(b)), one PCI Express downstream device 12 having 8 lanes and two PCI Express downstream device 13 each having 4 lanes (FIG. 1(c)), or four PCI Express downstream device 14 each having 4 lanes (FIG. 1(d)).

However, in view of the PCI Express upstream device, what the downstream configuration will be is unknown and required to be estimated during initialization. The downstream configuration is determined according to a plurality of links, each involving a series of state transitions.

SUMMARY OF THE INVENTION

In a state negotiation method of a PCI-E upstream device supporting multiple downstream configurations according to an embodiment of the present invention, a state of a second link asserted by a second state machine of the PCI-E upstream device is detected when a first link asserted by a first state machine of the PCI-E upstream device is ready to change from a first state to a second state in a specified duration. A negotiating procedure is performed to have the first link and the second link enter the second state simultaneously if the second link is detected to be in the first state within the specified duration.

According to an embodiment of the present invention, a data transmitter includes an upstream device, a plurality of downstream devices and a plurality of links, through which data are transmitted from the downstream devices to the upstream device. The plurality of links go through a series of state changes before data transmission for determining whether the data transmitted through the plurality of links should be merged or not, and during the series of state changes, a state of a second link is detected when a first link is ready to change from a first state to a second state in a specified duration, and negotiating to have the first link and the second link enter the second state simultaneously if the second link is detected to be in the first state within the specified duration.

In a method according to an embodiment of the present invention for transmitting data between an upstream device and a plurality of downstream devices through a plurality of links, whether a specified link among the plurality of links is ready to change from a first state to a second state in a specified duration is detected. States of other links among the plurality of links are also detected when the specified link is ready to change from the first state to the second state. The specified link and the links detected to be in the first state within the specified duration negotiate with one another to enter the second state simultaneously. Then, data transmitted through specified links among the plurality of links, whose state changes stop at a specified configuration, can be merged.

DETAILED DESCRIPTION OF THE PREFERRED EMBODIMENT

After a computer system equipped with a PCI-E architecture is booted, state machines of an upstream device will execute a series of state changes of respective links during the initialization of downstream device(s). The links could be independent from each other, indicating two independent downstream devices, or they could be merged into one large link, indicating a single downstream device. For determining the downstream configuration, the state changes of the links are monitored and negotiate with each other according to the present invention.

Figure 1A:
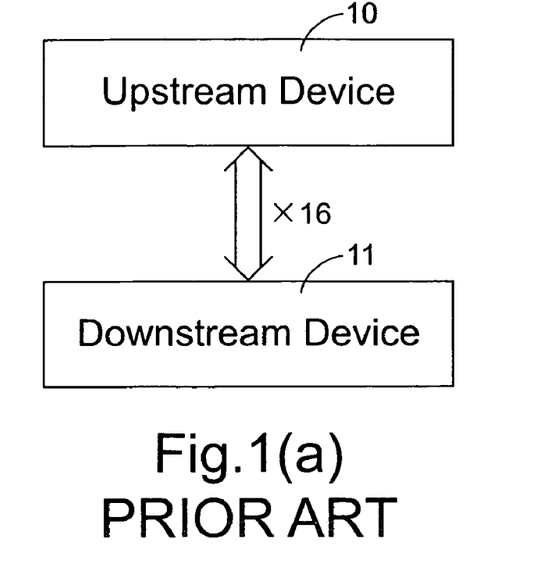
FIGS. 1(a), 1(b), 1(c) and 1(d) are functional block diagrams schematically illustrating four downstream configurations adapted to be coupled to a PCI-E upstream device.
Figure 1B:
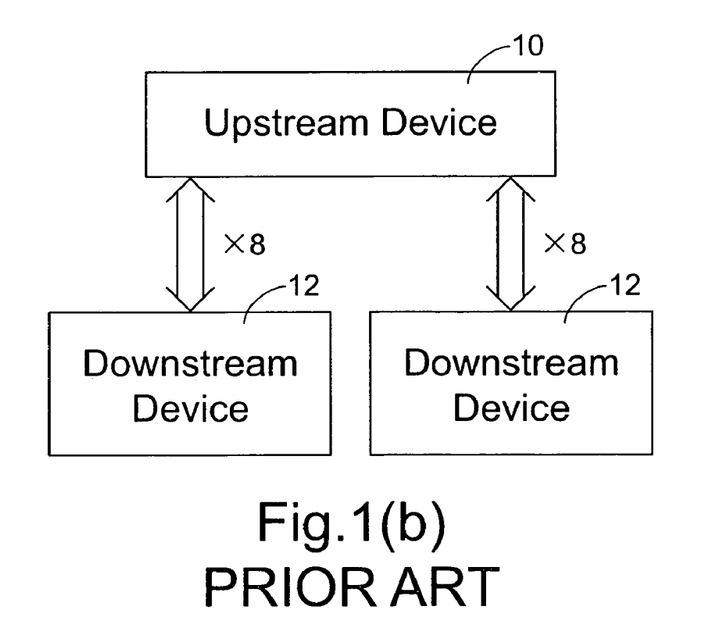
Figure 1C:
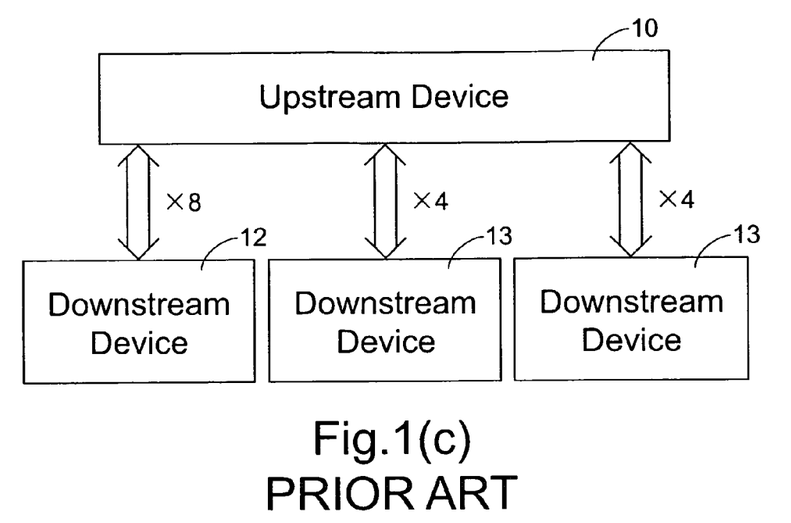
Figure 1D:
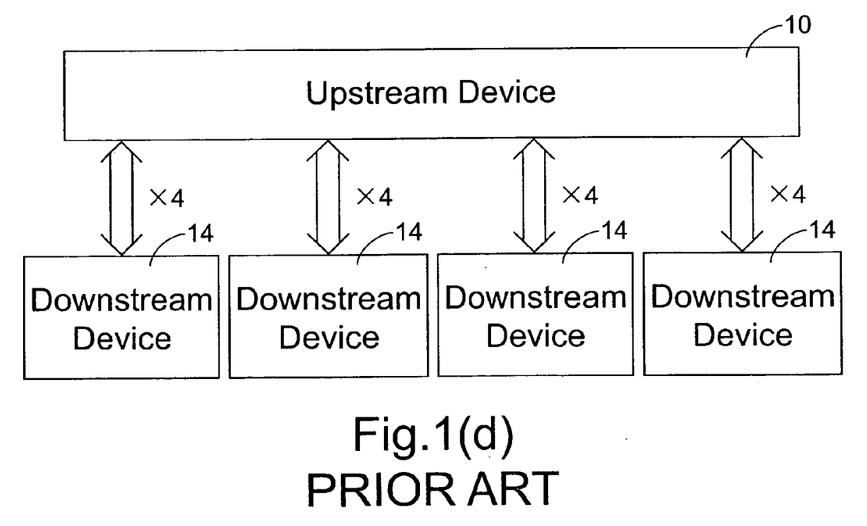
Figure 2:
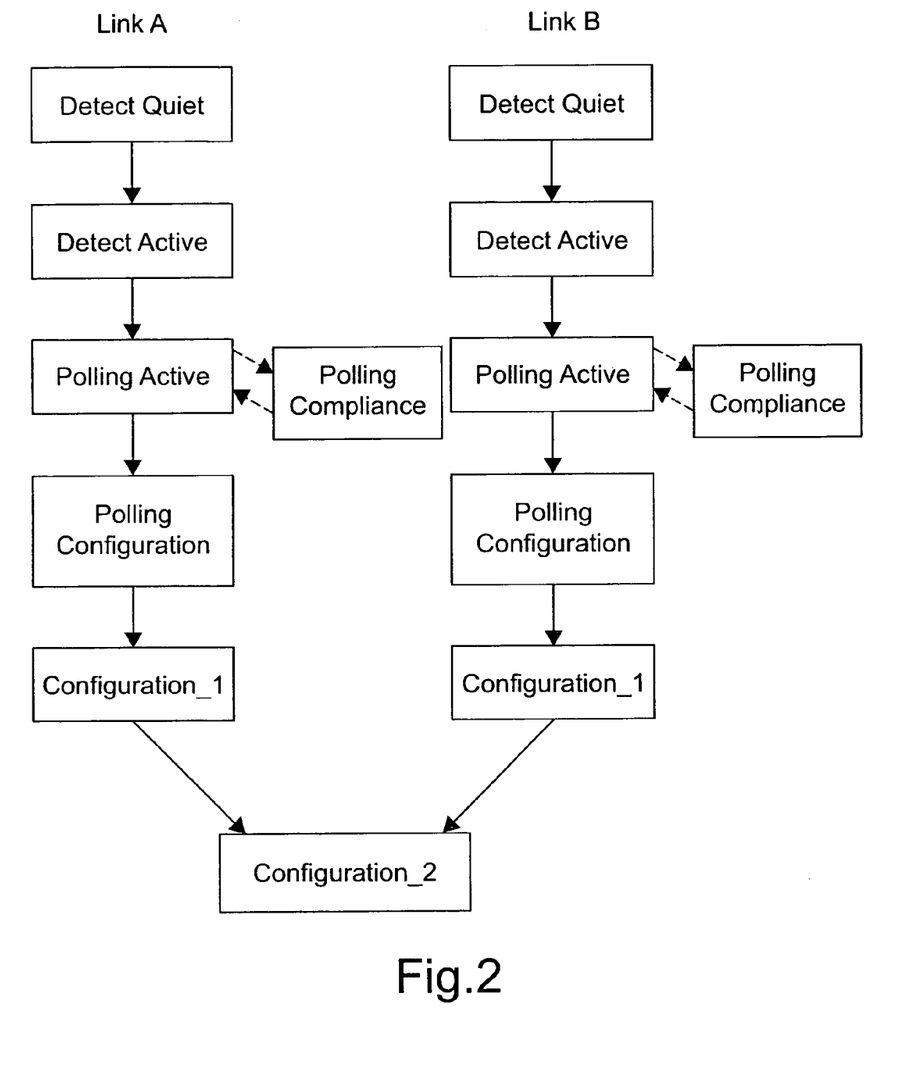
FIG. 2 is a state transition diagram illustrating two links A and B asserted by respective state machines of an upstream device.

FIG. 2 is a state transition diagram illustrating two links A and B asserted by respective state machines of the upstream device. The states include Detect.Quiet, Detect.Active, Polling.Active, Polling.Compliance, and configuration statement. The two links could be independent from each other and the state transitions thereof both stop at respective Configuration_1 states indicative of two independent downstream devices, or they could be merged into one large link and result in a single Configuration_2 indicative of a single downstream device.

For example, assuming that an upstream device can support a downstream device having 16 lanes and also support two downstream devices each having 8 lanes, while the stop of the state transition of FIG. 2 for both links at Configuration_1 indicates a downstream configuration of two 8-lane downstream devices, the merge of the links to Configuration_2 indicates a downstream configuration of a single 16-lane downstream device.

Figure 3A:
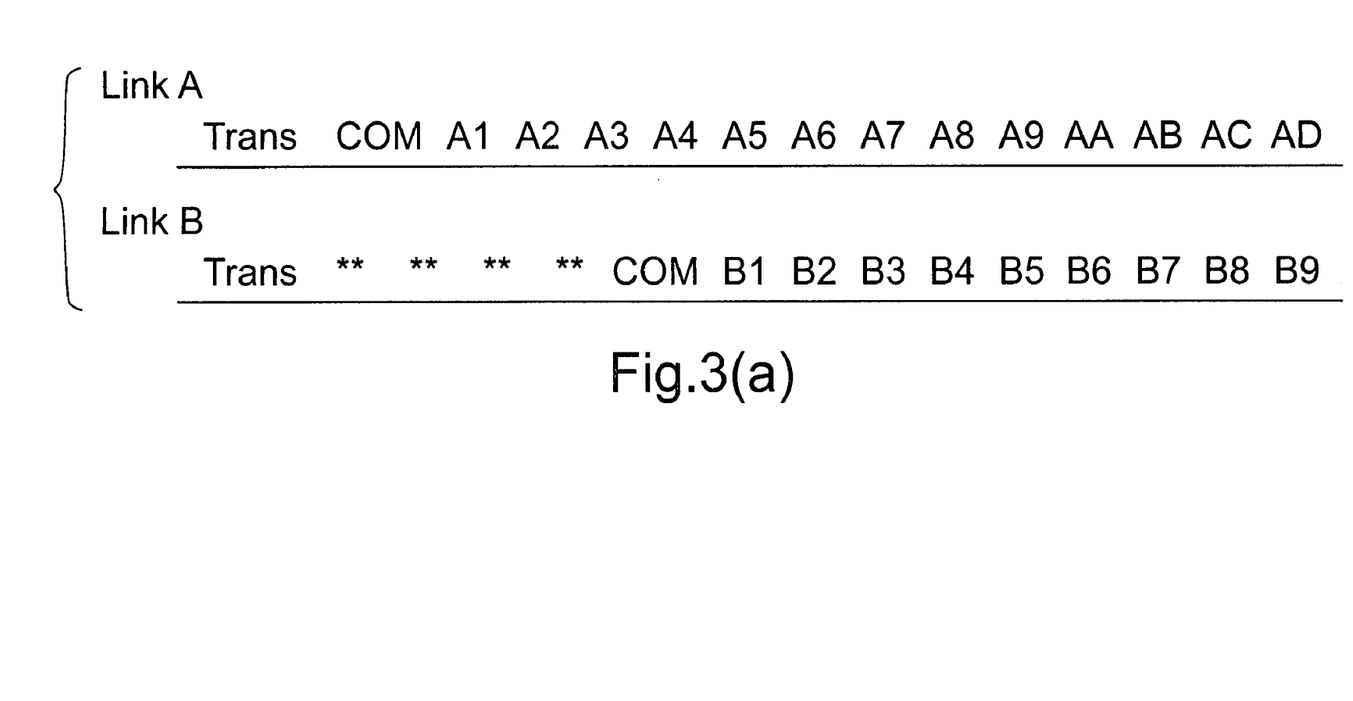
FIG. 3(a) is a schematic diagram illustrating inconsistency in packet transmission of links A and B that are supposed to be merged.
Figure 3B:
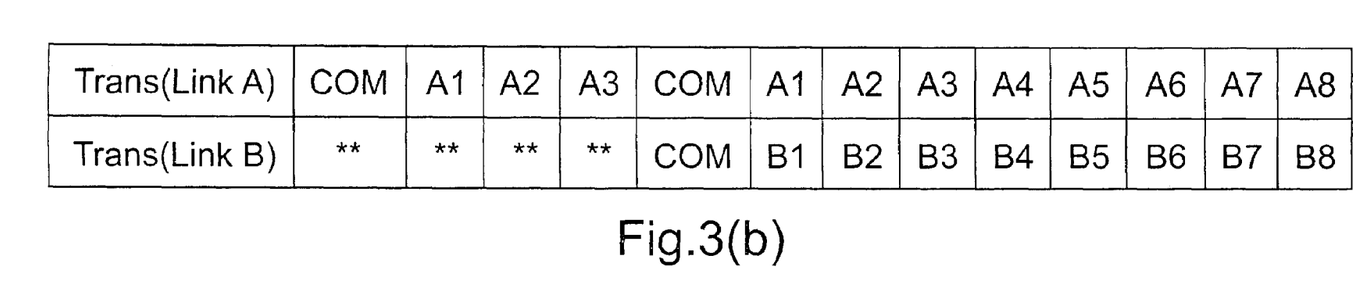
FIG. 3(b) is a schematic diagram illustrating a solution to synchronize the packet transmission between links A and B of FIG. 3(a)
Figure 3C:
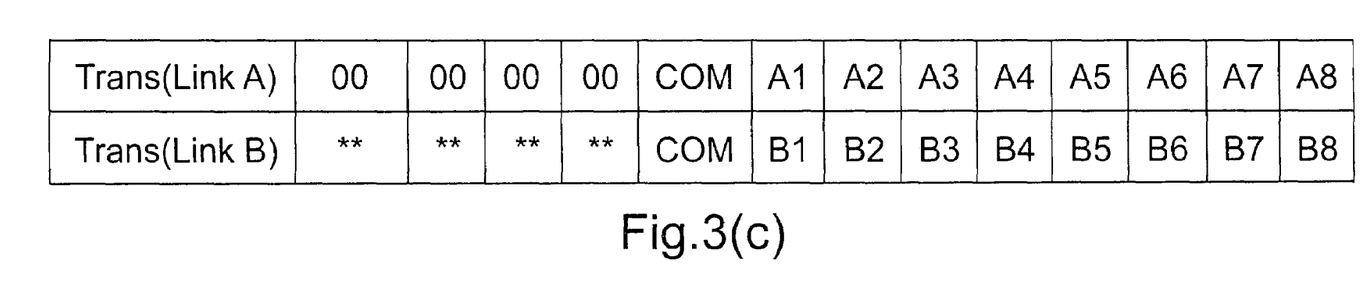
FIG. 3(c) is a schematic diagram illustrating another solution to synchronize the packet transmission between links A and B of FIG. 3(a)

Since the state changes of the links A and B are asserted by respective state machines independently, the state transition timing may be inconsistent. Therefore, synchronization is essential to the case that mergence of the two links should occur. FIG. 3(a) exemplifies packet transmission after both links A and B have entered Configuration_1 state, wherein the packet "COM" represents the time point when the Configuration_1 state is entered and the link B is 4 cycles behind the link A. In order to successfully merge the links A and B, the packet transmission of the leading link A is suspended, and instead, the leading four packets "COM","A1","A2" and "A3" are resent so as to synchronize with the link B, as shown in FIG. 3(b). Alternatively, the packet transmission of the leading link A is suspended, and instead, four invalid packets "00" are inserted so as to synchronize with the link B, as shown in FIG. 3(c).

Although the asynchronous problem is solved to some extent, the synchronization procedure may still be helpless once the mergence of the links fails due to unexpected long delay of either of the links. Furthermore, the aforementioned synchronization behavior is not stipulated in the PCI-E specification, and thus may be unable to be correctly interpreted and executed.

In an embodiment of the present invention, when a first link in a first state is ready to enter a second state in a specified duration, the state of a second link is checked. If the second link detected within the specified duration is also in the first state, the two links might be relevant to each other. Therefore, the two links will negotiate with each other to proceed to the second state simultaneously. That is, the state transition of the first link will be delayed until the second link is ready to enter the second state. Otherwise, if the state of the second link detected within the specified duration is different from the state of the first link to some extent, the two links might be independent. Then, the first link will directly move to the second state upon the specified duration is due. Since the specified duration is provided for serving as a reference as mentioned above, it is used as a judge window.

Figure 4:
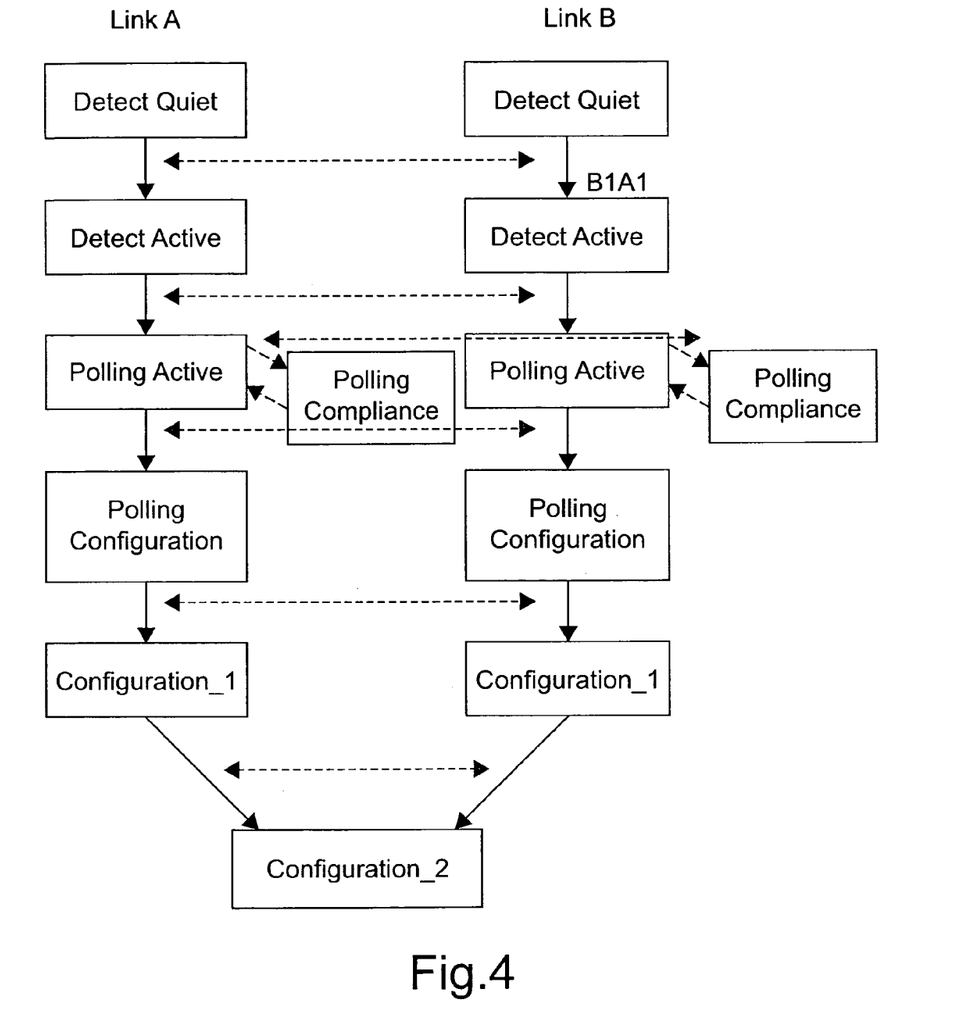
FIG. 4 is a state transition diagram illustrating two links A and B asserted by respective state machines of an upstream device and negotiate with each other according to an embodiment of the present invention.

An example is depicted in FIG. 4 and will be described hereinafter. In this example, an upstream device can support a downstream device having 16 lanes and also support two downstream devices each having 8 lanes. Two links A and B are executed by state machines of the upstream device. The states involved in each link include Detect.Quiet, Detect.Active, Polling.Active, Polling.Compliance, and configuration statement. While the stop of the state transition for both links at Configuration_1 indicates a downstream configuration of two 8-lane downstream devices, the merge of the links to Configuration_2 indicates a downstream configuration of a single 16-lane downstream device. The horizontal dash lines connecting links A and B schematically illustrate proper negotiation timing. For example, when link A, which is in the Detect.Active state, is ready to enter the Polling.Active state, the state of link B is detected with the judge window. If link B is also in the Detect.Active state, the state transition of the leading link A to the Polling.Active state will be delayed until link B is ready to enter the Polling.Active state. In other words, it is intended to make links A and B enter Polling.Active state synchronously. On the other hand, if link B is not in the Detect.Active state within the judge window, the leading link A will not be delayed.

Although state negotiation is performed along with each state transition in the above example, the state negotiation can be performed intermittently or accompany specific state transition(s). Furthermore, although two links are exemplified above, more than two links may be involved depending on practical applications. For example, the states of all the other links can be checked with the judge window when the leading link is ready to move to next state. The consistent states of some or all of the links will result in the mergence of these comparable links.

According to the present invention, a judge window is used to determine whether the states of the links are comparable so as to estimate whether the links are independent or not. If the links are supposed to be merged finally, the present negotiation method synchronizes the state transition so as to facilitate the mergence of the links. Accordingly, no unexpected packet transmission synchronization is required any more. The time width of the judge window can be preset according to practical needs. While a small judge window may shorten the delay time, a large judge window may reduce error probability.

Once the links are determined to be merged, data subsequently transmitted through these links will be merged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A state negotiation method of a PCI-E upstream device supporting multiple downstream configurations, comprising steps of:
   detecting a state of a second link between a second state machine of the PCI-E upstream device and a downstream configuration when a first link between a first state machine of the PCI-E upstream device and the downstream configuration is ready to change from a first state to a second state in a specified duration; and
   negotiating to have the first link and the second link enter the second state simultaneously if the second link is detected to be in the first state within the specified duration.

2. The state negotiation method according to claim 1 further comprising a step of independently having the first link enter the second state if the second link is detected to be not in the first state within the specified duration.

3. The state negotiation method according to claim 2 further comprising a step of determining the downstream configuration includes at least two downstream devices if the first link and the second link both stop at a first configuration.

4. The state negotiation method according to claim 3 further comprising a step of determining the downstream configuration includes a downstream device associated with both the first and second links if the first link and the second link both stop at a second configuration.

5. The state negotiation method according to claim 1 wherein the negotiating step is performed for each state transition.

6. The state negotiation method according to claim 1 wherein the negotiating step is performed for one or some state transitions.

7. The state negotiation method according to claim 1 further comprising steps of:
   detecting a state of a third link between a third state machine of the PCI-E upstream device and the downstream configuration when the first link between the first state machine of the PCI-E upstream device and the downstream configuration is ready to change from the first state to the second state in the specified duration; and
   negotiating to have the first link and the third link enter the second state simultaneously if the third link is detected to be in the first state within the specified duration.

8. The state negotiation method according to claim 7 wherein the first link, the second link and the third link enter the second state simultaneously if the second link and the third link are detected to be both in the first state within the specified duration.

9. A data transmitter, comprising:
an upstream device;
a plurality of downstream devices; and
a plurality of links, through which data are transmitted from the downstream devices to the upstream device,
wherein the plurality of links go through a series of state changes before data transmission for determining whether the data transmitted through the plurality of links should be merged or not, and during the series of state changes, a state of a second link is detected when a first link is ready to change from a first state to a second state in a specified duration, and negotiating to have the first link and the second link enter the second state simultaneously if the second link is detected to be in the first state within the specified duration.

10. The data transmitter according to claim 9 wherein the first link enters the second state independently if the second link is detected to be not in the first state within the specified duration.

11. The data transmitter according to claim 9 wherein the data transmitted through the first link and the second link are independently processed when the state changes of both the links stop at a first configuration, and the data transmitted through the first link and the second link are merged when the state changes of both the links stop at a second configuration.

12. The data transmitter according to claim 9 wherein the upstream device is a PCI Express upstream device having a multi-lane port communicable with the plurality of downstream devices that are PCI Express downstream devices.

13. The data transmitter according to claim 9 wherein the series of state changes are asserted by state machines of the upstream device.

14. A method for transmitting data between an upstream device and a plurality of downstream devices through a plurality of links, comprising steps of:
detecting whether a specified link among the plurality of links is ready to change from a first state to a second state in a specified duration;
detecting whether there is any other link among the plurality of links in the first state when the specified link is ready to change from the first state to the second state;
negotiating to have the specified link and the link or links detected to be in the first state enter the second state simultaneously; and
merging data transmitted through specified links among the plurality of links, whose state changes stop at a specified configuration.

15. The method according to claim 14 further comprising a step of independently processing data transmitted through specified links among the plurality of links, whose state changes stop at another specified configuration.

16. The method according to claim 14 further comprising a step of independently having the specified link enter the second state if there is no other link among the plurality of links detected to be in the first state within the specified duration.

17. The method according to claim 14 for use in a PCI Express system.

* * * * *

UNITED STATES PATENT AND TRADEMARK OFFICE
CERTIFICATE OF CORRECTION

PATENT NO. : 7,631,136 B2 Page 1 of 1
APPLICATION NO. : 11/490351
DATED : December 8, 2009
INVENTOR(S) : Jin-Liang Mao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this

Second Day of November, 2010

David J. Kappos
*Director of the United States Patent and Trademark Office*